United States Patent
Lin et al.

(10) Patent No.: US 10,878,575 B2
(45) Date of Patent: Dec. 29, 2020

(54) FOREGROUND-AWARE IMAGE INPAINTING

(71) Applicant: Adobe Inc., San Jose, CA (US)

(72) Inventors: Zhe Lin, Fremont, CA (US); Wei Xiong, Rochester, NY (US); Connelly Barnes, Seattle, WA (US); Jimei Yang, Mountain View, CA (US); Xin Lu, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 24 days.

(21) Appl. No.: 16/384,039

(22) Filed: Apr. 15, 2019

(65) Prior Publication Data

US 2020/0327675 A1 Oct. 15, 2020

(51) Int. Cl.
*G06T 7/149* (2017.01)
*G06T 7/13* (2017.01)
*G06T 7/194* (2017.01)
*G06T 5/00* (2006.01)

(52) U.S. Cl.
CPC .............. *G06T 7/149* (2017.01); *G06T 5/005* (2013.01); *G06T 7/13* (2017.01); *G06T 7/194* (2017.01); *G06T 2207/20081* (2013.01); *G06T 2207/20084* (2013.01)

(58) Field of Classification Search
CPC ........................ G06N 3/08; G06N 7/005; G06T 2207/20081; G06T 2207/20084; G06T 2207/20076; G06T 7/11; G06T 7/13; G06T 7/194; G06K 9/66
See application file for complete search history.

(56) References Cited

U.S. PATENT DOCUMENTS

2019/0114774 A1 4/2019 Zhang
2019/0130229 A1 5/2019 Lu et al.

OTHER PUBLICATIONS

Liu, Ran et al. "Hole-filling Based on Disparity Map and Inpainting for Depth-Image-Based Rendering," 2016; International Journal of Hybrid Information Technology, vol. 9, No. 5 (2016); pp. 145-164 (Year: 2016).*
Arbelaez, Pablo, et al., "Contour Detection and Hierarchical Image Segmentation", IEEE Trans Pattern Anal. Mach. Intell., 33(5), May 2011, 20 pages.

(Continued)

*Primary Examiner* — Peter Hoang
(74) *Attorney, Agent, or Firm* — Kilpatrick Townsend & Stockton LLP

(57) ABSTRACT

In some embodiments, an image manipulation application receives an incomplete image that includes a hole area lacking image content. The image manipulation application applies a contour detection operation to the incomplete image to detect an incomplete contour of a foreground object in the incomplete image. The hole area prevents the contour detection operation from detecting a completed contour of the foreground object. The image manipulation application further applies a contour completion model to the incomplete contour and the incomplete image to generate the completed contour for the foreground object. Based on the completed contour and the incomplete image, the image manipulation application generates image content for the hole area to generate a completed image.

17 Claims, 7 Drawing Sheets

(56) References Cited

OTHER PUBLICATIONS

Ashikhmin, Michael, "Synthesizing Natural Textures", In Proceedings of the 2001 symposium on Interactive 3D graphics, ACM, 2001, 10 pages.

Ballester, C., et al., "Filling-In by Joint Interpolation of Vector Fields and Gray Levels", IEEE transactions on image processing, 10(8), 2001, 12 pages.

Barnes, Connelly, et al., "Patchmatch: A Randomized Correspondence Algorithm for Structural Image Editing", ACM Transactions on Graphics (TOG) (Proceedings of SIGGRAPH 2009), 2009, 10 pages.

Bertalmio, M, et al., "Simultaneous Structure and Texture Image Inpainting", IEEE Transactions on Image Processing, 12(8), 2003, 6 pages.

Efros, Alexei A., et al., "Texture Synthesis by Nonparametric Sampling", In Computer Vision, 1999, The Proceedings of the Seventh IEEE International Conference on, vol. 2, IEEE, Sep. 1999, 6 pages.

Goodfellow, Ian J., et al., "Generative Adversarial Nets", In Advances in Neural Information Processing Systems, 2014, 9 pages.

Hou, Qibin, et al., "Deeply Supervised Salient Object Detection With Short Connections", In IEEE CVPR, 2017, 10 pages.

Huang, Jia-Bin, et al., "Image Completion Using Planar Structure Guidance", ACM Transactions on Graphics (TOG), 33(4):129, 2014, 10 pages.

Hung, Jason C., et al., "Exemplar-Based Image Inpainting Base on Structure Construction", Journal of Software, vol. 3, No. 8, 2008, 8 pages.

Iizuka, Satoshi, et al, "Globally and Locally Consistent Image Completion", ACM Transactions on Graphics (TOG), 36(4), 2017, 14 pages.

Isola, Phillip, et al., "Image To-Image Translation With Conditional Adversarial Networks", arXiv:1611.07004v2, 2017, 17 pages.

Karras, Tero, et al., "Progressive Growing of GANs for Improved Quality, Stability, and Variation", arXiv preprint arXiv:1710.10196, 2017, 25 pages.

Lin, Tsung-Yi, et al., "Focal Loss for Dense Object Detection", IEEE Transactions on Pattern Analysis and Machine Intelligence, 2018, 9 pages.

Liu, Guillin, et al., "Image Inpainting for Irregular Holes Using Partial Convolutions", arXiv preprint arXiv:1804.07723, 2018, 23 pages.

Liu, Ziwei, et al., "Deep Learning Face Attributes in the Wild", In Proceedings of International Conference on Computer Vision (ICCV), Dec. 2015, 9 pages.

Lowe, David G., "Distinctive Image Features From Scale-Invariant Keypoints", International Journal of Computer Vision, 60(2), 2004, 28 pages.

Mount, David M., et al., "Ann: library for approximate nearest neighbor searching", Semantic Scholar, 1998, 2 pages.

Pathak, Deepak, et al., "Context Encoders: Feature Learning by Inpainting", In Proceedings of the IEEE Conference on Computer Vision and Pattern Recognition, 2016, 12 pages.

Philbin, James, et al., "Lost in quantization: Improving particular object retrieval in large scale image databases", In Proceedings of the IEEE Conference on Computer Vision and Pattern Recognition, 2008, 8 pages.

Pnevmatikakis, Eftychios A, et al., "An Inpainting System for Automatic Image Structure-Texture Restoration With Text Removal", In Image Processing, 2008. ICIP 2008. 15th IEEE International Conference, IEEE, 2008, 4 pages.

Simakov, Denis, et al., "Summarizing Visual Data Using Bidirectional Similarity", In Computer Vision and Pattern Recognition, 2008, CVPR 2008, IEEE Conference 2008, 8 pages.

Song, Yuhang, et al., "Contextual-Based Image Inpainting: Infer, Match, and Translate", Computer Vision Foundation, ECCV 2018, 17 pages.

Yu, Jiahui, et al., Free-Form Image Inpainting With Gated Convolution, arXiv preprint arXiv:1806.03589, 2018, 12 pages.

Yu, Jiahui, et al., "Generative Image Inpainting With Contextual Attention", arXiv preprint, arXiv:1801.07892v1, 2018, 15 pages.

Zhou, Bolei et al., "Places: A 10 million image database for scene recognition", IEEE Transactions on Pattern Analysis and Machine Intelligence, 2017, 14 pages.

\* cited by examiner ical field

FOREGROUND-AWARE IMAGE INPAINTING

TECHNICAL FIELD

This disclosure relates generally to computer-implemented methods and systems for computer graphics processing. Specifically, the present disclosure involves image inpainting or hole filling by taking into account foreground objects in the image.

BACKGROUND

Image inpainting is the process of reconstructing lost or deteriorated parts of an image, also called hole filling. For example, image inpainting can be used to fill the holes generated by removing distracting objects from an image. Existing image inpainting techniques fill holes in an image by borrowing information from image regions surrounding the hole area. These existing techniques do not consider the information about the actual extent of foreground and background regions within the holes. As a result, they often produce noticeable artifacts in the completed image, especially near the contour of the foreground objects, if the hole area overlaps with or touches the foreground objects.

SUMMARY

Certain embodiments involve foreground aware image inpainting. In one example, an image manipulation application receives an incomplete image that includes a hole area. The hole area does not have image content. The image manipulation application applies a contour detection operation to the incomplete image. The contour detection operation detects an incomplete contour of a foreground object in the incomplete image. The hole area prevents the contour detection operation from detecting a completed contour of the foreground object. The image manipulation application further applies a contour completion model to the incomplete contour and the incomplete image. The contour completion model is trained to generate the completed contour for the foreground object. The image manipulation application generates image content for the hole area based on the completed contour and the incomplete image to generate a completed image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
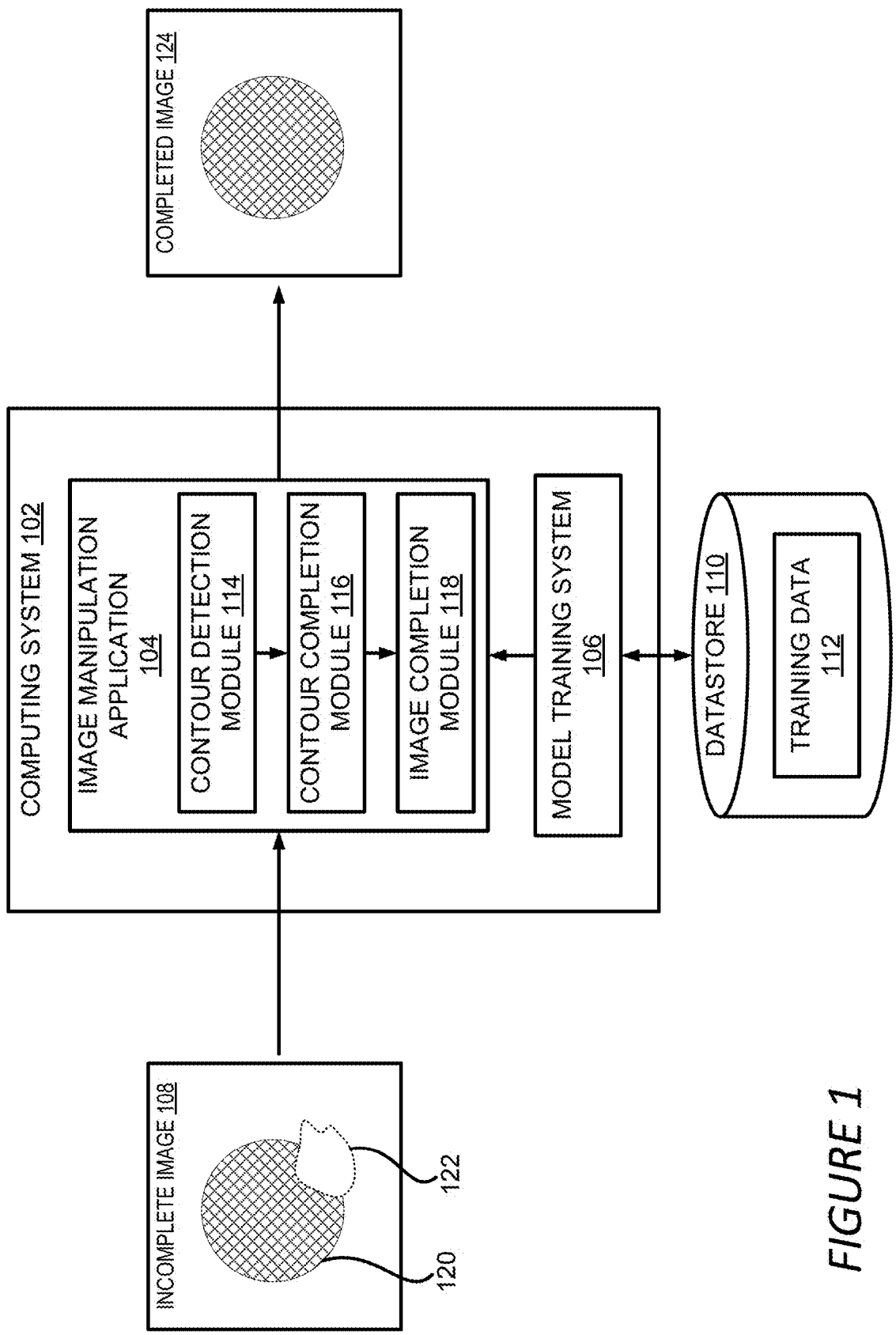
FIG. 1 depicts an example of a computing environment for using foreground aware image inpainting to fill a hole area of an image, according to certain embodiments of the present disclosure.

The present disclosure involves foreground aware image inpainting. As discussed above, existing image inpainting methods often generate unsatisfactory results especially in filling a hole area that overlaps with or touches a foreground objects. Certain embodiments described herein address these limitations by taking into account the foreground objects of an image to fill a hole area of the image. For instance, an image manipulation application detects a foreground object in an image that contains a hole area and extracts the contour of the foreground object. If the hole area overlaps with the foreground object, a portion of the contour of the object might fall in the hole area which prevents the image manipulation application from detecting a completed contour of the foreground object. The image manipulation application detects an incomplete contour and employs a contour completion model to generate a completed contour for the foreground object. The image manipulation application further generates the image content to fill the hole area of the image under the guidance of the completed contour so that the image content is generated to respect the contour of the foreground object in the image.

The following non-limiting example is provided to introduce certain embodiments. In this example, an image manipulation application receives an image containing a hole area that does not have image content. Such an image is also referred to herein as an "incomplete image." As used herein, the term "image" refers to a photo, a picture, a digital painting, a computer-generated graphic, or any other artifact that depicts visual perception.

The image manipulation application may employ a contour detection module to detect a contour of a foreground object of the incomplete image. For example, the contour detection module may detect a foreground object in the incomplete image by employing a salient region segmentation method to generate a foreground map. The contour detection module may further remove the noise from the foreground map and apply an edge detector to detect the contour of the foreground object. In some scenarios, the hole area overlaps the foreground object and contains a portion of the contour of the foreground image. As a result, the detected contour of the foreground object may miss the portion that is covered by the hole area. Without the missing portion of the contour, image inpainting would be performed with little guidance on the structure of the content of the image leading to visible artifacts in the completed image especially around the contour area.

The image manipulation application may further employ a contour completion module to generate the missing portion of the contour to arrive at a completed contour of the foreground object. Having the completed contour available to an inpainting operation can guide the inpainting process to avoid generating image content that is inconsistent with the structure foreground object reflected in its contour. To generate the completed contour, the contour completion module may apply a machine-learning model (e.g., a generative adversarial network (GAN)) that is trained to predict image contours from a combination of input images and partial contours for those incomplete images. The image manipulation application can send the completed contour to an image complete module to fill the hole area of the incomplete image under the guidance of the completed contour. The image completion module may accept the incomplete image and the completed contour of the foreground object and apply them to an image completion model, such as a GAN model, to fill the hole area of the incomplete image. The resulting image of the hole filling process is also referred to herein as a completed image.

As described herein, certain embodiments provide improvements in image processing by detecting, completing and using the contour of a foreground object of an image in the image inpainting process. The inpainting process utilizes the contour of the foreground object to distinguish the foreground portion from the background portion of the hole area so that these two portions are treated differently to avoid introducing visible artifacts in the completed image, especially near the contour of the foreground object. The foreground aware image inpainting thus improves the visual quality of the completed image by respecting the contour of the foreground object during image inpainting thereby reducing or even eliminating the artifacts in the completed image.

Example Operating Environment for Foreground Aware Image Inpainting

Referring now to the drawings, FIG. 1 depicts an example of a computing environment 100 for using foreground aware image inpainting to fill a hole area of an incomplete image 108. The computing environment 100 includes a computing system 102, which can include one or more processing devices that execute an image manipulation application 104 to perform foreground aware image inpainting and a model training system 106 for training the various machine learning models used in the foreground aware image inpainting. The computing environment 100 further includes a datastore 110 for storing data used in the image inpainting, such as the training data 112 used by the model training system 106.

The image manipulation application 104 can receive an incomplete image 108 that contains a hole area 122 lacking image content. The hole area 122 might be generated by a user removing unwanted content, such as a distracting object, from the image. The hole area 122 might also be generated by the image manipulation application 104 or other image processing applications by processing images, such as building a three-dimensional environment map based on a two-dimensional (2D) image, or generating a pair of stereo images from a single 2D image. The incomplete image 108 might be generated in various other ways. Accordingly, the image manipulation application 104 can receive the incomplete image 108 by a user uploading or specifying the incomplete image 108 or by receiving it from another software module within or outside the image manipulation application 104.

To fill the hole area 122 of the incomplete image 108, the image manipulation application 104 can employ a contour detection module 114, a contour completion module 116 and an image completion module 118. The contour detection module 114 can be configured for detecting foreground objects 120 in the incomplete image 108 and extracting the contour of the foreground objects 120. If a foreground object 120 overlaps with the hole area 122, the contour of the foreground object 120 might also be corrupted, i.e. a portion of the object contour is missing, resulting in an incomplete contour. The image manipulation application 104 can employ the contour completion module 116 trained to generate the missing portion of the contour.

In one example, the contour completion module 116 can apply a machine learning model, such as a GAN, to the incomplete contour. The output of the machine learning model can contain a completed contour of the foreground object 120. Using the completed contour as a guidance, the image complete module 118 can fill the hole area 122 of the incomplete image 108, for example, using another machine learning model trained to generate a completed image 124 based on the incomplete image 108. Detailed examples of the contour detection module 114, the contour completion module 116 and the image completion module 118 contained in the image manipulation application 104 are described herein with respect to FIG. 3.

To obtain the various models used in the above described image inpainting process, the computing system 102 can employ the model training system 106 to build and train the models. For example, the model training system 106 can be configured to train the machine learning model used by the contour completion module 116 to generate the completed contour, referred to herein as the "contour completion model." Training the contour completion model can include generating training data 112 for the model. The training data 112 can include training samples each including an input and an output. The input in a training sample can include an incomplete image and an incomplete contour. The output can include the corresponding completed contour. The training process can further involve adjusting the parameters of the contour completion model so that a loss function calculated based on the outputs of the contour completion model and the completed contours contained in the training samples is minimized.

Similarly, the model training system 106 can also be configured to train the machine learning model used for generating the completed image 124, referred to herein as the "image completion model." The training may also involve generating training data 112 for the image completion model. The training data 112 can include training samples each including an input and an output. The input in a training sample can include an incomplete image, a completed contour and other types of data, such as a hole mask indicating the location of the hole area 122. The output can include the corresponding completed image. The training can further involve adjusting the parameters of the image completion model so that a loss function calculated based on the outputs of the image completion model and the completed images contained in the training samples is minimized. Detailed examples of training the contour completion model and the image completion model are described herein with respect to FIGS. 5-6. Additional details regarding the foreground aware image inpainting are described herein with respect to FIGS. 2-7.

Figure 2:
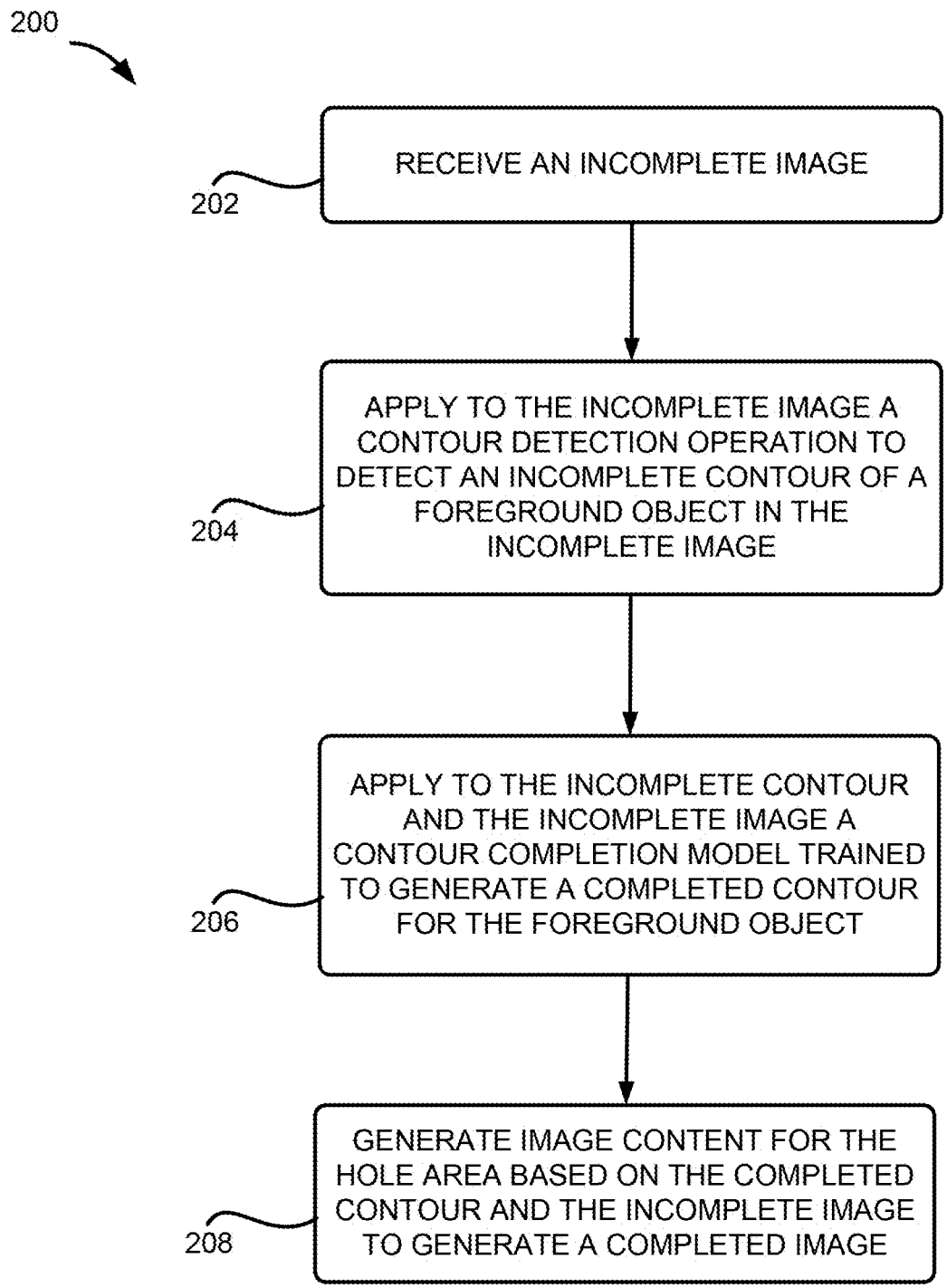
FIG. 2 depicts an example of a process for generating image content for a hole area of an incomplete image based on a contour of a foreground object in the incomplete image to generate a completed image, according to certain embodiments of the present disclosure.

Examples of Computer-Implemented Operations for Foreground Aware Image Inpainting FIG. 2 depicts an example of a process 200 for generating image content for a hole area of an incomplete image based on a contour of a foreground object in the incomplete image to generate a completed image, according to certain embodiments of the present disclosure. It should be noted that in the example of the process 200 shown in FIG. 2, various models used for generating the image content have been already been trained. The training process of these models are discussed below with respect to FIGS. 5 and 6. FIG. 2 is described in conjunction with FIG. 3 where an example of a block diagram of the software modules used for foreground aware image inpainting is depicted. One or more computing devices (e.g., the computing system 102) implement operations depicted in FIG. 2 by executing suitable program code (e.g., the image manipulation application 104). For illustrative purposes, the process 200 is described with reference to certain examples depicted in the figures. Other implementations, however, are possible.

At block 202, the process 200 involves receiving an incomplete image 108 for image inpainting. For instance, the image manipulation application 104 can receive the incomplete image 108 by a user operating in a user interface presented by the image manipulation application 104 to select or otherwise specify the incomplete image 108. The image manipulation application 104 might also receive the incomplete image 108 from another module of the image manipulation application 104 or another application executing on the computing system 102 or anther computing system. The incomplete image 108 might be stored locally on the computing system 102 or sent to the image manipulation application 104 via a network.

Figure 3:
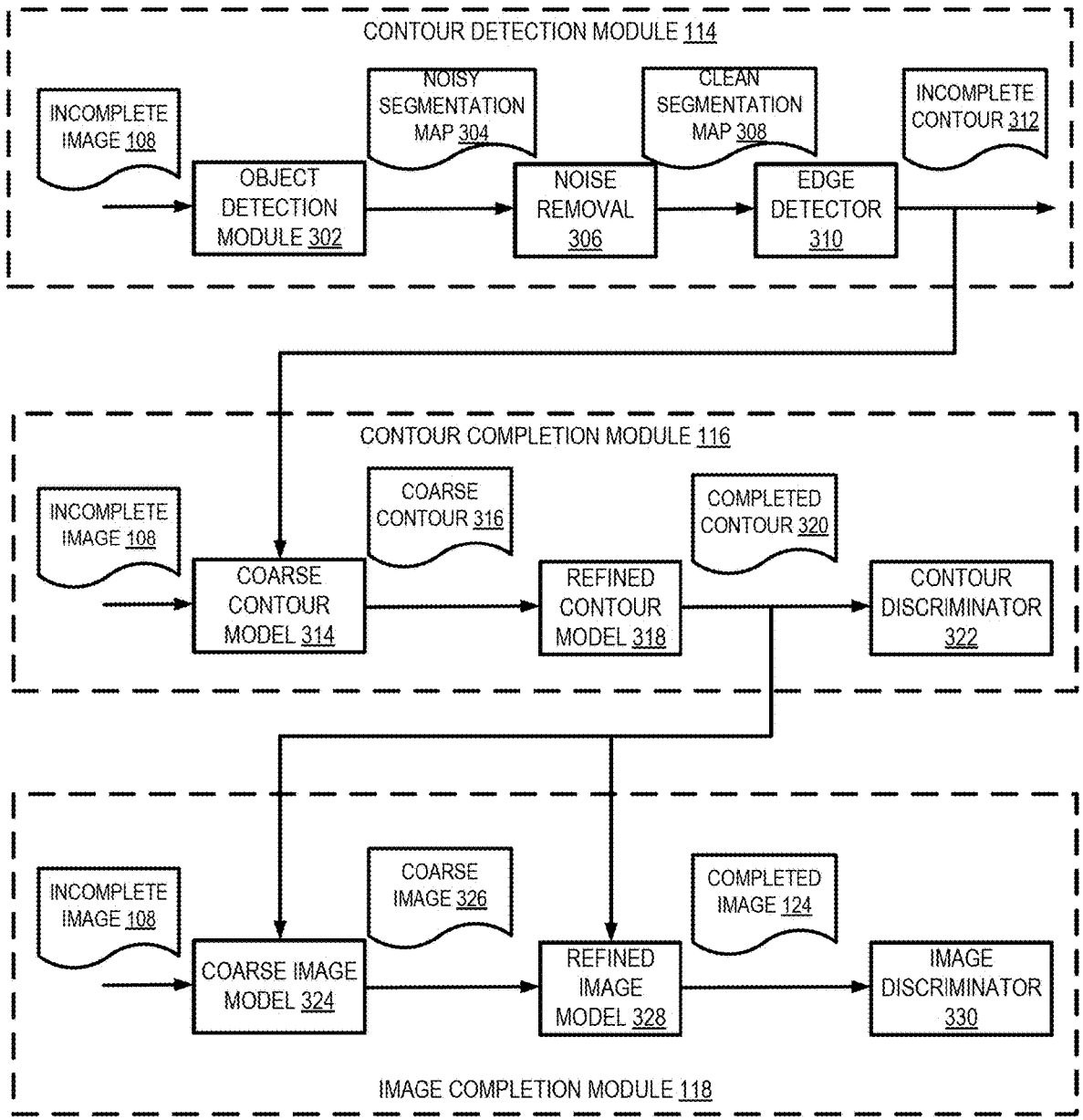
FIG. 3 depicts an example of a block diagram of the various software modules used for foreground aware image inpainting, according to certain embodiments of the present disclosure.

At block 204, the process 200 involves applying, to the incomplete image 108, a contour detection operation that detects an incomplete contour of a foreground object in the incomplete image 108. One or more computing devices execute program code from the image manipulation application 104 to implement block 204. For instance, the image manipulation application 104 can apply a contour detection module 114 to detect a foreground object in the incomplete image 108 and extract the contour of the foreground object. FIG. 3 illustrates an example block diagram of the contour detection module 114.

In the example shown in FIG. 3, the contour detection module 114 includes an object detection module 302, a noise removal module 306 and an edge detector 310. The object detection module 302 can be configured to detect foreground objects in the incomplete image 108. In one example, the object detection module 302 employs a salient region segmentation model to detect the foreground objects. For example, DeepCut can be utilized to detect the foreground objects. DeepCut is a deep learning-based technology for salient region segmentation from a single image. To build a DeepCut model, a new dataset of personal images with humans, group of humans, pets, or other types of salient foreground objects are collected. Based on the new dataset, a deep neural network is trained. The deep neural network has an architecture called Deep Y-Net that includes low-level and high-level streams with dense blocks of boundary refinement to build a unified segmentation model for humans, group of humans, pets, and a generic model for segmenting arbitrary salient objects.

Other segmentation mechanisms can also be utilized to identify the foreground objects. For instance, semantic segmentation can be utilized to segment objects, such as a human or a car, based on understanding the content of the image. The segmentation model can be trained using complete images and applied to the incomplete image 108 for segmentation. The segmentation model can also be trained using incomplete images with hole areas generated randomly.

Because the input incomplete image 108 contains a hole area 122, the resulting segmentation map 304 might include noises and is thus referred to as noisy segmentation map 304. The noises might be generated, for example, by the object detection module 302 treating some hole areas as foreground objects or by the object detection module 302 mischaracterizing certain regions as the foreground objects. To remove the noises in the noisy segmentation map 304, the contour detection module 114 can utilize a hole mask of the incomplete image 108 that indicates the position of the hole area in the incomplete image 108. The hole mask can have the same size as the incomplete image 108 and can include binary values with is indicating the hole area and Os indicating non-hole area, or vice versa. The hole mask can also use other values to indicate the hole area, such as non-binary integer values or real values. In another example, the hole mask might include three different values indicating the foreground, the background and the hole area. In some scenarios, the hole mask can accompany the incomplete image 108 when the incomplete image 108 is received. In other scenarios, the contour detection module 114 can generate the hole mask based on the incomplete image 108.

The object detection module 302 can use the hole mask to remove the regions in the segmentation map that may be mistakenly identified as foreground objects. In a further example, the noise removal module 306 can apply connected component analysis to remove some of the small clusters in the noisy segmentation map 304 to obtain a clean segmentation map 308. Based on the clean segmentation map 308, the contour detection module 114 can utilize the edge detector 310, such as the Sobel operator, to detect the contour of the foreground object. Due to the existence of the hole area, the detected contour might be an incomplete contour 312.

Referring back to FIG. 2, at block 206, the process 200 involves applying, to the incomplete contour 312 and the incomplete image 108, a contour completion model to generate a completed contour for the foreground object. One or more computing devices execute program code from the image manipulation application 104 to implement block 206. For example, the image manipulation application 104 can employ the contour completion module 116 trained to predict the missing portion of the foreground object contour. FIG. 3 illustrates an example block diagram of the contour completion module 116. In the example shown in FIG. 3, the contour completion module 116 employs a contour completion model implemented as a GAN to generate the completed contour. Specifically, the contour completion model includes a coarse contour generative model 314, a refined contour generative model 318 and a contour discriminator 322.

For example, the coarse contour generative model 314 can employ a convolutional neural network, such as an encoder decoder network with several convolutional and dilated convolutional layers, to generate a coarse contour 316. The coarse contour 316 can be a rough estimate of the missing contours of the foreground object. The predicted contours around the holes might be blurry and might not be used as an effective guidance for the image completion module 118.

To infer a more accurate contour, the contour completion module 116 can employ a refined contour generative model 318 that is configured to accept the coarse contour 316 as an input, and output a more precise contour to be used as the completed contour 320. In one implementation, the refined contour model 318 has a similar structure as the coarse contour generative model 314, i.e. a convolutional neural network, such as an encoder decoder network. In a further implementation, the refined contour generative model 318 can also include a contextual attention layer in the encoder decoder network to explicitly utilize surrounding image features as references while inferring the missing values of the contour. The contextual attention layer is a neural network layer which allows neural feature matching or patch matching by implementing dense patch similarity computation with convolutional operations.

The contour discriminator 322 can be configured to determine whether the generated contour by the refined contour generative model 318 is real or not. The contour discriminator 322 can be utilized at the training stage of the contour completion model to facilitate adjusting the parameters of the coarse contour generative model 314 and the refined contour generative model 318 to achieve a more precise generation of the completed contour. In one example, the contour discriminator 322 is a fully convolutional PatchGAN discriminator that outputs a score map instead of a single score so as to tell the realism of different local regions of the generated completed contour 320. Additional details on using the contour discriminator 322 in the training stage of the contour completion model are described herein with respect to FIG. 5.

Referring back to FIG. 2, at block 208, the process 200 involves generating image content for the hole area based on the completed contour 320 and the incomplete image 108 to generate a completed image 124. One or more computing devices execute program code from the image manipulation application 104 to implement block 206. For example, the image manipulation application 104 can employ an image completion module 118 that is trained to predict the image content for the hole area of the incomplete image 108. The image completion module 118 can accept the incomplete image 108, the completed contour 320 of the foreground object and other information as inputs, and output the completed image 124. The completed contour 320 of the foreground object can provide a guidance to the image completion module 118 regarding the foreground and the background regions of the incomplete image 108 so that the image completion module 118 can fill the hole area without interrupting the contours of the foreground object.

FIG. 3 illustrates an example block diagram of the image completion module 118. In the example shown in FIG. 3, the image completion module 118 employs an image completion model implemented as a GAN to generate the completed image 124. Similar to the contour completion model, the image completion model includes a coarse image generative model 324, a refined image generative model 328 and an image discriminator 330.

The coarse image generative model 324, the refined image generative model 328 and the image discriminator 330 are similar to the coarse contour generative model 314, the refined contour generative model 318 and the contour discriminator 322, respectively, except that the inputs to these models of the image completion model are images rather than object contours. Specifically, the coarse image generative model 324 can accept the incomplete image 108 as an input and generate a coarse image 326 under the guidance of the completed contour 320. In one example, the completed contour 320 is binarized with a threshold, such as 0.5, before being used by the image completion model, such as the coarse image generative model 324 and the refined image generative model 328. In some implementations, the image completion module 118 can also input the hole mask to the coarse image generative model 324. In one example, the coarse image generative model 324 employs a convolutional neural network, such as an encoder decoder network.

To further improve the quality of the output image, the coarse image 326 generated by the coarse image generative model 324 can be fed into the refined image generative model 328 which generates a completed image 124. The refined image generative model 328 can include a convolutional neural network, such as an encoder decoder network. The refined image generative model 328 can further include a contextual attention layer in the encoder decoder network similar to the refined contour model 318 as discussed above. The contextual attention layer in the refined image generative model 328 can be configured to match features inside the hole area to outside the hole area and borrow the features from outside the hole area to fill the hole area.

In some scenarios, it is likely that the generated image by the refined image generative model 328 does not respect the contour of the object because the number of layers of mapping in the image completion model becomes high and the knowledge provided by the completed contour is weakened due to error accumulation. Thus, in one example, the completed contour 320, or the binarized version of the completed contour 320, can be again input into the refined image generative model 328 to guide the generation of the completed image 124.

Similar to the contour discriminator 322, the image discriminator 330 can be used at the training stage of the image completion model and configured to determine whether the completed image 124 generated by the refined image generative model 328 is real or not. As will be discussed in detail later, the image discriminator 330 can facilitate the adjustment of the parameters of the coarse image generative model 326 and the refined image generative model 328 to achieve a more precise generation of the completed image 124. Similar to the contour discriminator 322, the image discriminator 330 can also be implemented using PatchGAN, or other types of discriminator. Additional details about using the image discriminator 330 at the training stage of the image completion model are described herein with respect to FIG. 6.

With the generated completed image 124, the image manipulation application 104 can satisfy the request for image inpainting by sending the completed image 124 to the requesting application or causing it to be presented to a user, such as through a display device of the computing system 102 or other devices accessible to the user.

Figure 4:
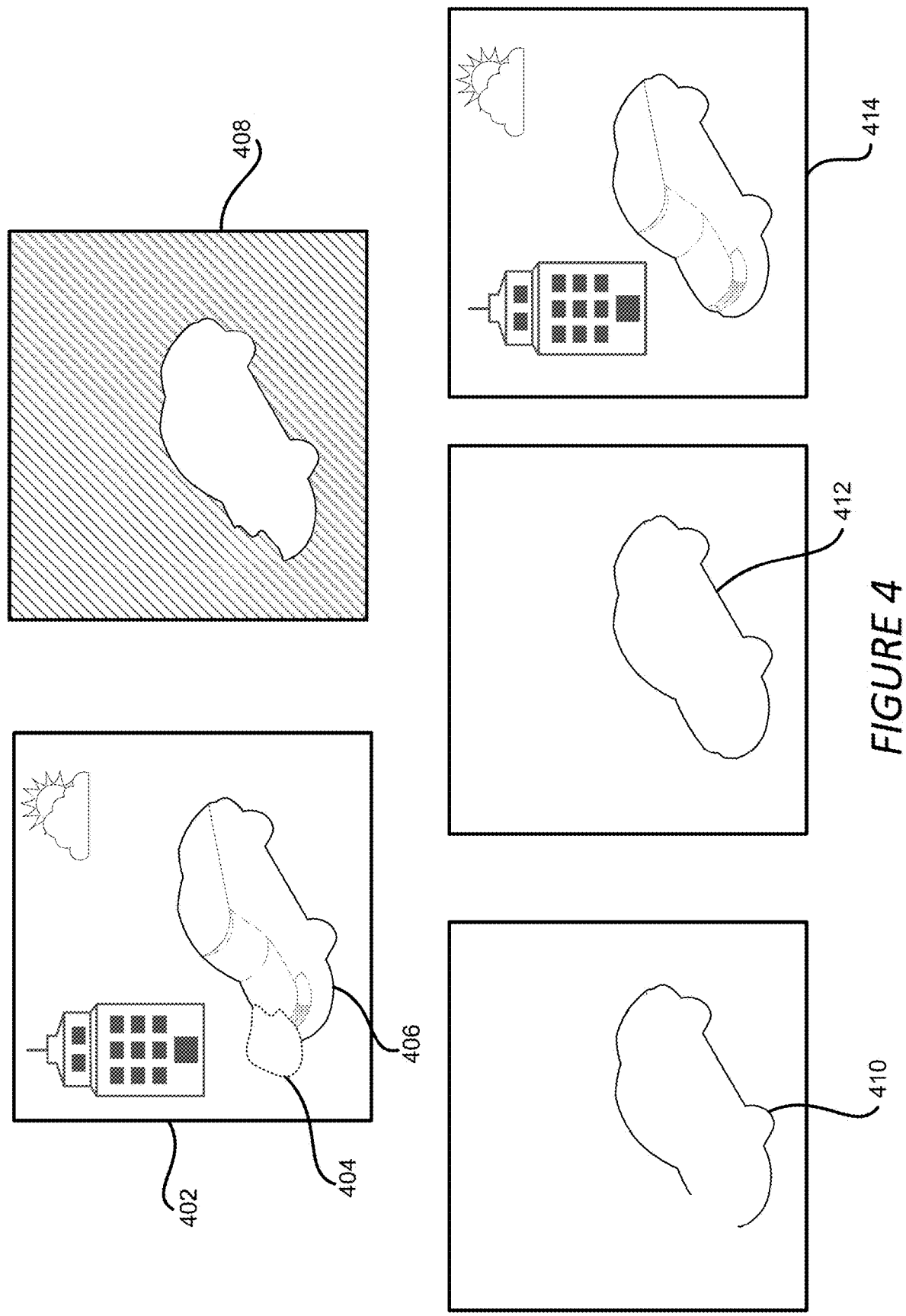
FIG. 4 depicts an example of images and contours involved in the foreground aware image inpainting for an incomplete image, according to certain embodiments of the present disclosure.

FIG. 4 depicts an example of images and contours involved in the foreground aware image inpainting for an incomplete image, according to certain embodiments of the present disclosure. In the example shown in FIG. 4, incomplete image 402 includes background content, such as the building, the cloud and the sun in the sky, and foreground content, such as the car object 406. There is a hole area 404 in the incomplete image 402 and the hole area 404 overlaps with the foreground car object 406, and corrupts the contour of the car object.

FIG. 4 further shows a segmentation map 408, which can be a clean segmentation map 308 discussed above with regard to FIG. 3, where the foreground car object 406 is segmented out of the rest of the incomplete image 402. Based on the segmentation map 408, the contour detection module 114 detects the contour 410 of the foreground car object 406. Because the hole area 404 overlaps with the contour of the foreground car object 406, the detected contour 410 is an incomplete contour where the portion of the contour 410 that overlaps with the hole area 404 is missing.

The contour completion module 116 accepts the incomplete contour 410 as an input along with other inputs such as the incomplete image 402 and generates a completed contour 412 using the coarse contour generative model 314 and the refined contour generative model 318 contained in the contour completion model. The completed contour 412 is utilized by the coarse image generative model 324 and the refined image generative model 328 to generate image content for the hole area 404 and thus a completed image 414 where the content of the right front portion of the car is filled in by the image completion model.

Figure 5:
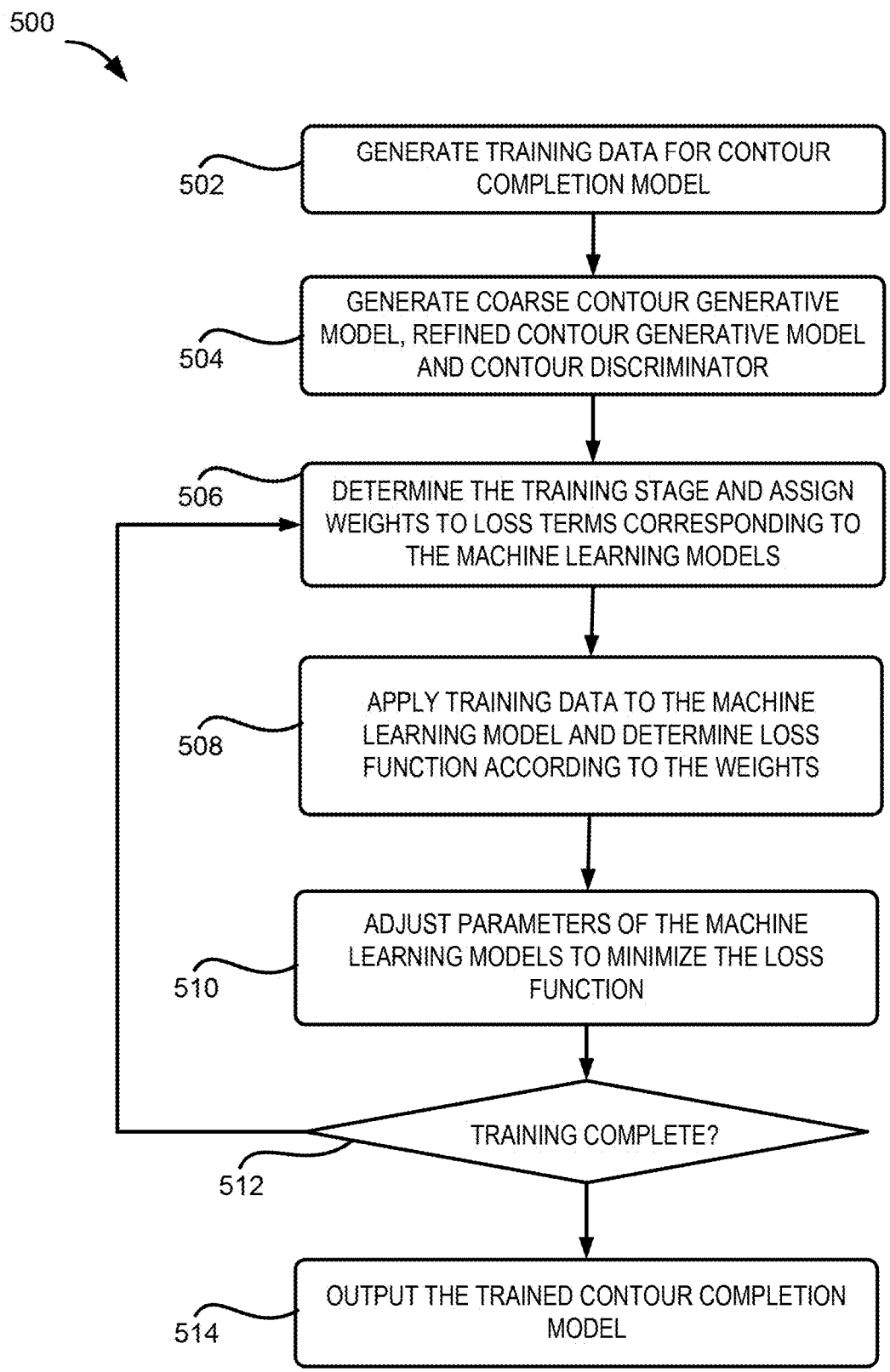
FIG. 5 depicts an example of a process for generating and training a contour completion model used in the foreground aware image inpainting, according to certain embodiments of the present disclosure.

Examples of Computer-Implemented Operations for Training Models Used in Foreground Aware Image Inpainting FIG. 5 depicts an example of a process 500 for generating and training contour completion model used in the foreground aware image inpainting as described above, according to certain embodiments of the present disclosure. One or more computing devices (e.g., the computing system 102) implement operations depicted in FIG. 5 by executing suitable program code (e.g., the model training system 106). For illustrative purposes, the process 500 is described with reference to certain examples depicted in the figures. Other implementations, however, are possible.

At block 502, the process 500 involves generating training data for the contour completion model. In one example, the model training system 106 generates the training data by collecting natural images that contain one or more foreground objects. The images can be collected from public datasets, such as the MSRA-10K dataset and Flickr natural image dataset, or proprietary image datasets. Each collected image can be annotated with an accurate segmentation mask, either manually or automatically using object segmentation techniques. To achieve a high accuracy in the results of the image inpainting, the collected images contain diverse content including a large variety of objects, such as animals, plants, persons, faces, buildings, streets and so on. The relative size of objects in each image also has a large variance so that the contour completion model can be exposed to a large variety of object sizes at the training stage. In one implementation, the training images contain 15,762 images among which 12,609 are used for training and 3,153 are used for testing.

To obtain the contour of segmented objects, the model training system 106 can apply an edge detector, such as the Sobel edge operator, on the segmentation mask. In one example, the mask $C_f$ is obtained by applying the Sobel operator: $C_f=|G_x|+|G_y|$, where $G_x$ and $G_y$ are the vertical and horizontal derivative approximations of the segmentation mask, respectively. The model training system 106 can further binarize the mask with a thresholding mechanism and obtain a binary contour $C_{gt}$ as the ground-truth contour of the training image.

In addition to the images and contours of the images, the model training system 106 can also generate the hole areas for each training image. Considering that in real-world inpainting applications, the distractors that users want to remove from images are usually arbitrarily shaped, the hole areas on each image are thus generated with arbitrary shapes. For example, the hole areas can be manually and randomly generated with a brush, or automatically generated by the model training system 106 in a random or pseudo-random way. In one example, the generated hole areas have two types: arbitrarily shaped holes that can appear in any region of the input image and arbitrarily shaped holes that are restricted so that they have no overlaps with the foreground objects.

For the first type of hole areas, it is likely that a hole area overlaps with a foreground object. This scenario is designed to handle the cases when unwanted objects are inside the foreground objects or partially occlude the foreground objects. The second type of hole areas are generated to simulate the cases where the unwanted regions or distracting objects are behind the foreground objects. To generate the second type of hole areas, the model training system 106 can generate, or cause to be generated, randomly and arbitrarily shaped holes. The model training system 106 then removes the parts of holes that have overlap with the foreground objects. It should be understood that while the above process for generating training data is described in the context of training the contour completion model, it can be utilized to generate the training data for training the image completion model described with regard to FIG. 6.

At block 504, the process 500 involves generating a GAN model that includes a generative model and a discriminator. In some examples, such as the example shown in FIG. 3, the generative model includes a coarse contour generative model and a refined contour generative model, and the discriminator includes a contour discriminator. For each of the models in the GAN, the model training system 106 can determine model parameters such as the number of layers in the network involved in the model, the weights between layers, and other parameters. In some implementations, the model training system 106 can pre-train the models of the GAN using a different dataset so that the training process described below using the training data generated at block 502 can converge faster.

At block 506, the process 500 involves determining the current stage of the training and assigning weights to different terms in a loss function based on the training stage. For the contour completion model shown in FIG. 3, the loss function includes three terms, one for the coarse contour generative model 314, one for the refined contour generative model 318, and one for the contour discriminator 322. In one example, the loss terms for the coarse contour generative model 314 and the refined contour generative model 318 measures the content loss of the generated contours compared with the ground truth contours, and thus these loss terms are also referred to as "content loss." The loss term for the contour discriminator 322 on the other hand is referred to as "adversarial loss."

In one example, the model training system 106 can adopt curriculum training where the weights assigned to the terms in the loss function vary over time and are determined based on the stages of the training process. In this example, the training is divided into three stages. At the first stage of the training process, the contour completion model outputs a rough contour and the model training system 106 focuses on training the generative model, i.e. the coarse contour generative model 314 and the refined contour generative model 318. The model training system 106 thus assigns non-zero weight to the content loss terms and zero or close to zero weight to the adversarial loss.

At the second stage of the training process, the training starts to converge. At this stage, the model training system 106 fine-tunes the models using the contour discriminator 322 and assigns a non-zero weight to the adversarial loss. In one example, the weight of the adversarial loss compared to the weight of the content loss terms is made relatively small, such as 0.01:1, to avoid training failure due to the instability of the GAN loss for contour prediction. At the third stage of the training, the model training system 106 continues to fine-tune the entire contour completion model by assigning more weight to the adversarial loss. For example, the model training system 106 can make the weight of adversarial loss and the weight of the content loss terms to be comparable, e.g. 1:1.

The different stages of the training process can be determined by comparing the loss function or the difference between the generated completed contour and the ground truth contour, to one or more threshold values. For example, the model training system 106 can employ two threshold values with one being higher than the other. If the loss function or the difference is above the higher threshold, the generated contour is a coarse contour and the training is determined to be at the first stage. If the loss function or the difference is below the higher threshold, but above the lower threshold, the generated contour is more accurate than the coarse contour generated earlier and the training can be determined to be at the second stage. If the loss function or the difference is below the lower threshold, the generated contour is close to the ground truth contour, the model training system 106 can determine that the training is at the third stage.

This above example of determining training stage is for illustration purposes, and should not be construed as limiting. Various other ways of determining the training stage can also be utilized, alone or in combination with the above described method. For example, the training stage can be determined by examining the changes in the loss functions in consecutive iterations. The training can be determined to be at the first stage until the loss function starts to decrease from iteration to iteration, i.e. entering the second stage. Similarly, the training can be determined to be at the third stage if the decrease in loss functions of adjacent iterations slows down.

At block 508, the model training system 106 applies the training data generated at block 502 to the contour completion model. That is, the inputs in training samples can be fed into the coarse contour generative model 314 to generate respective coarse contours 316, which are fed into to the refined contour generative model 318 to obtain completed contours 320. The completed contours 320 can be further fed into the contour discriminator 322 to determine whether they are real or not. For each of the models, the model training system 106 can determine a loss function term. Denote the coarse contour 316 generated by the coarse contour generative model 314 as $C_C^{cos}$ and the completed contour 320 output by the refined contour generative model 318 as $C_C^{ref}$. Further from the above description, the ground truth contour is denoted as $C_{gt}$. The loss functions for the coarse contour generative model 314 and the refined contour generative model 318 can be defined as the L1 or L2 distance between the respective output contour $C_C^{cos}$ or $C_C^{ref}$ and the ground truth contour $C_{gt}$ in raw pixel space. These definitions, however, are likely to cause data imbalance problem because the data in the contours are sparse.

To address this potential issue, the inherent nature of a contour can be utilized in one example, i.e., each pixel in the contour can be interpreted as the probability that the pixel is a boundary pixel in the original image. Accordingly, the contour can be treated as samples of a distribution, and the distance between the coarse contour 316 (or the completed contour 320) and the ground-truth contour can be calculated by calculating the binary cross-entropy between each location. The model training system 106 can further adopt a focal loss to balance the importance of each pixel. Considering that the goal of the contour completion model is to complete the missing contours, more focus can be applied on the pixels in the hole areas by applying a larger weight.

The loss function for the coarse contour generative model 314 can thus be defined as follows:

$$L_{con}^C(C_C^{cos}, C_{gt}) = \alpha H(C_C^{cos} - C_{gt})^2 L_e(C_C^{cos}, C_{gt}) + (1-H)(C_C^{cos} - C_{gt})^2 L_e(C_C^{cos}, C_{gt}), \quad (1)$$

where $\alpha$ is a parameter to adjust the relative weights applied to the pixels inside and outside the hole area. In one example, $\alpha$ takes a value higher than 1, such as 5 so that more weights are applied to the pixels inside the hole area. $L_e(x,y)$ is the binary cross-entropy loss function, and x and y are predicted probability and the ground-truth probability, respectively. $L_e(x,y)$ can be formulated as:

$$\mathcal{L}_e(x, y) = \begin{cases} -\log(x) & \text{if } y = 1 \\ -\log(1-x) & \text{otherwise} \end{cases}. \quad (2)$$

The loss function $L_{con}^C(C_C^{ref}, C_{gt})$ for the refined contour generative model 318 can be defined similarly by replacing $C_C^{cos}$ with $C_C^{ref}$ in Eqn. (1). Since both the loss function $L_{con}^C(C_C^{cos}, C_{gt})$ and the loss function $L_{con}^C(C_C^{ref}, C_{gt})$ measure the difference between the generated contour by the respective model and the ground truth contour, these two loss functions form the content loss function $L_{con}^C$ of the contour completion mode, i.e.

$$L_{con}^C = L_{con}^C(C_C^{cos}, C_{gt}) + L_{con}^C(C_C^{ref}, C_{gt}) \quad (3)$$

The focal loss used above is helpful in generating a clean contour. However, in some scenarios although the edges in the uncorrupted regions can be reconstructed well, the contours in the corrupted regions are still blurry. To encourage the generative models to produce sharp and clean contours, the model training system 106 can further adopt the contour discriminator 322 to perform adversarial learning where a hinge loss function is employed to determine whether the input to the contour discriminator 322 is real or fake. The loss function for the contour discriminator 322, i.e. the adversarial loss, for training the contour discriminator and the generator are as follows, respectively:

$$L_{adv}^C = E[\sigma(1 - D^C(C_{gt}))] + E[\sigma(1 + D^C(C_C^{ref}))], \quad (4)$$

$$L_{adv}^C = -E[D^C(C_C^{ref})], \quad (5)$$

where the $\sigma(x)$ is the ReLU function, defined as $\sigma(x) = x^+ = \max(0, x)$.

Training the GAN of the contour completion model involves a min-max game between the discriminator and the generator. For each iteration of the training, the discriminator is trained by fixing the generator, and then the generator is trained by fixing the discriminator. In one example, the model training system 106 applies Eqn. (4) as the loss function for the contour discriminator 322 when the contour discriminator 322 is trained and applies Eqn. (5) as the loss function for the contour discriminator 322 when the generator, i.e. the coarse contour generative model 314 and the refined contour generative model 318, are trained. The model training system 106 combines the content loss function defined in Eqn. (3) and the adversarial loss defined in Eqn. (4) or (5) as the overall loss function for the contour completion model based on the weights determined at block 506 for the respective terms.

At block 510, the process 500 involves adjusting the parameters of the contour completion model to solve an optimization problem, such as minimizing the overall loss function. For illustration purposes, solving the optimization problem can involve performing iterative adjustments of the weights of the generative and discriminative models. The weights of the models can be iteratively adjusted so that the value of the loss function in a current iteration is smaller than the value of the loss function in an earlier iteration. At block 512, the process 500 involves determining whether the training is complete and should be terminated. The model training system 106 can make this determination based on one or more conditions no longer being satisfied. For example, the training iteration can stop if the decrease in the values of the loss function in two adjacent iterations is no more than a threshold value.

If the model training system 106 determines that the training should continue, the process 500 involves another iteration where the model training system 106 determines, at the block 506, the current training stage and the corresponding weights for the different terms in the loss function. If the model training system 106 determines that the training is complete, the process 500 involves outputting the trained contour completion model to the image manipulation application 104 so that it can be used for foreground aware image inpainting.

Figure 6:
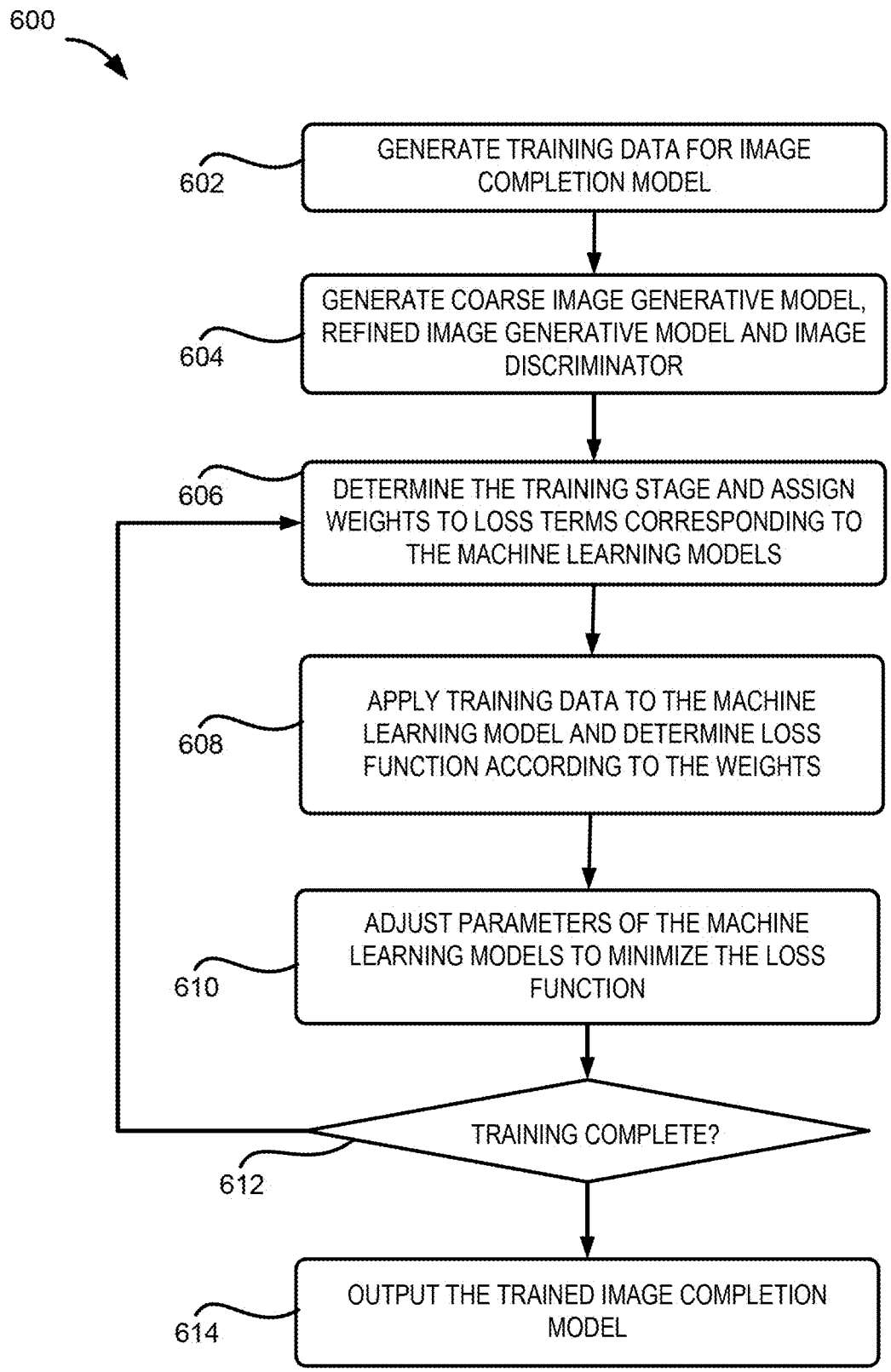
FIG. 6 depicts an example of a process for generating and training image completion model used in the foreground aware image inpainting, according to certain embodiments of the present disclosure.

FIG. 6, depicts an example of a process 600 for generating and training the image completion model used in the foreground aware image inpainting, according to certain embodiments of the present disclosure. The process 600 is similar to process 500 used to train the contour completion model.

At block 602, the model training system 106 generates the training data for the image completion model. In one example, the model training system 106 uses the image dataset and the training incomplete images generated in block 502 of FIG. 5. At block 604, the model training system 106 generates the GAN for the image completion model by utilizing a similar architecture as the GAN for the contour completion model, i.e. a generator including a coarse image generative model 324 and a refined image generative model 328, and a discriminator including the image discriminator 330 as described above with respect to FIG. 3. In one example, the model training system 106 can pre-train the GAN for the image completion model using another dataset, such as a large-scale image dataset, without considering the foreground object contour.

At block 606, the model training system 106 determines the training stage and the weights for different loss function terms in a way similar to that described above with respect to block 506 of FIG. 5. In other words, the curriculum training is also employed in the training of the image completion model. Specifically, the model training system 106 determines the current training stage of the image completion model. If the model training system 106 determines that the training is at the first stage, such as by determining that the difference between the generated completed image and the ground truth completed image is larger than a threshold value, the weight assigned to the image discriminator 330 can be close to zero compared with the weights assigned to the loss terms corresponding to the coarse image generative model 324 and the refined image generative model 328. If the model training system 106 determines that the training is at the second stage, such as by determining that the difference between the generated completed image and the ground truth completed image is below a threshold value, the weight assigned to the image discriminator 330 can be small relative to the weight assigned to the loss terms corresponding to the coarse image generative model 324 and the refined image generative model 328. If the model training system 106 determines that the training is at the third stage, such as by determining that the difference between the generated completed image and the ground truth completed image is below a smaller threshold value, the weight assigned to the image discriminator 330 can be close to the weights assigned to the loss terms corresponding to the coarse image generative model 324 and the refined image generative model 328, such as 1:1.

At block 608, the process 600 involves applying the training data to the image completion model and determining the loss function. The loss function for image completion model can also include a content loss, denoted as $L_{con}^I$ and an adversarial loss denoted as $L_{adv}^I$. The adversarial loss has a similar form as the loss terms for the contour completion model defined in Eqn. (4) and (5), except that the loss terms are applied to the images instead of the contours. For the content loss $L_{con}^I$, L1 loss is used in one example to minimize the distance between the generated image and the ground-truth image. The image content loss is defined as:

$$L_{con}^I = \|I_C^{Cos} - I_{gt}\|_1 + \|I_C^{ref} - I_{gt}\|_1, \quad (5)$$

where $I_C^{cos}$, $I_C^{ref}$ and $I_{gt}$ are the output of the coarse image model 324, the output of the refined image model 328, and the ground-truth image, respectively. The overall loss function of the image completion model can be determined to be $$L^I = w_{con} L_{con}^I + w_{adv} L_{adv}^I, \quad (5)$$

where the weights of the content loss and the adversarial loss, i.e. $w_{con}$ and $w_{adv}$ are determined as described above with regard to block 606 of the process 600.

The model training system 106 adjusts the parameters of the image completion model at block 610 and determines whether the training is completed at block 612 similar to that described above for block 510 and block 512, respectively. Likewise, similar to block 514, the model training system 106, at block 614, sends the trained image completion model to the image manipulation application 104 for it to be used in the foreground aware image inpainting.

It should be appreciated that although in the above description, the contour completion model and the image completion model are trained separately, they can be jointly trained. For example, a joint loss function can be established by, for example, generating a weighted sum of the loss functions for the contour completion model and the image completion model. In one implementation, the weights for the two loss functions are equal. In another implementation, the weight of one loss function is higher than the weight of the other loss function in order to tune the training process to focus on one of the models. For instance, a higher weight can be assigned to the loss function of the image completion model than that of the contour completion model so that the image completion model can be trained with higher accuracy.

It should be further appreciated that although the above description focuses on using the contour of the foreground to guide the inpainting process, other mechanisms can also be utilized. For example, a segmentation map, instead of the contour, of the foreground object can be utilized. Consequently, a segmentation map completion model can be generated to generate a completed foreground segmentation map. The segmentation map completion model may have a similar structure as the contour completion model shown in FIG. 3, i.e. a GAN model with a coarse segmentation model, a refined segmentation model, and a segmentation discriminator. The input to the segmentation completion model can include the incomplete image 108 and an incomplete segmentation map. The incomplete segmentation map can be the noisy segmentation map 304 or the clean segmentation map 308. The loss function for the contour completion model can also be similarly defined, such as by using the binary cross-entropy loss function defined in Eqn. (2). Likewise, the curriculum training described above for the contour completion model can also be employed in the training of the segmentation completion model. Joint training of the segmentation completion model and the image completion model can also be utilized.

In another example, the completed segmentation map can be generated by training and applying a machine learning model directly on the incomplete image 108 without generating an incomplete segmentation map. For example, the model used in the object detection module can be modified to output a completed segmentation map based on the input incomplete image 108. In another example, the machine learning model can include a GAN model with a similar structure as described in the above example. Because incomplete segmentation map is not generated in this example, the input to the GAN model can just include the incomplete image 108. Various other ways of generating the completed segmentation map can also be employed.

Computing System Example for Implementing Foreground Aware Image Inpainting

Figure 7:
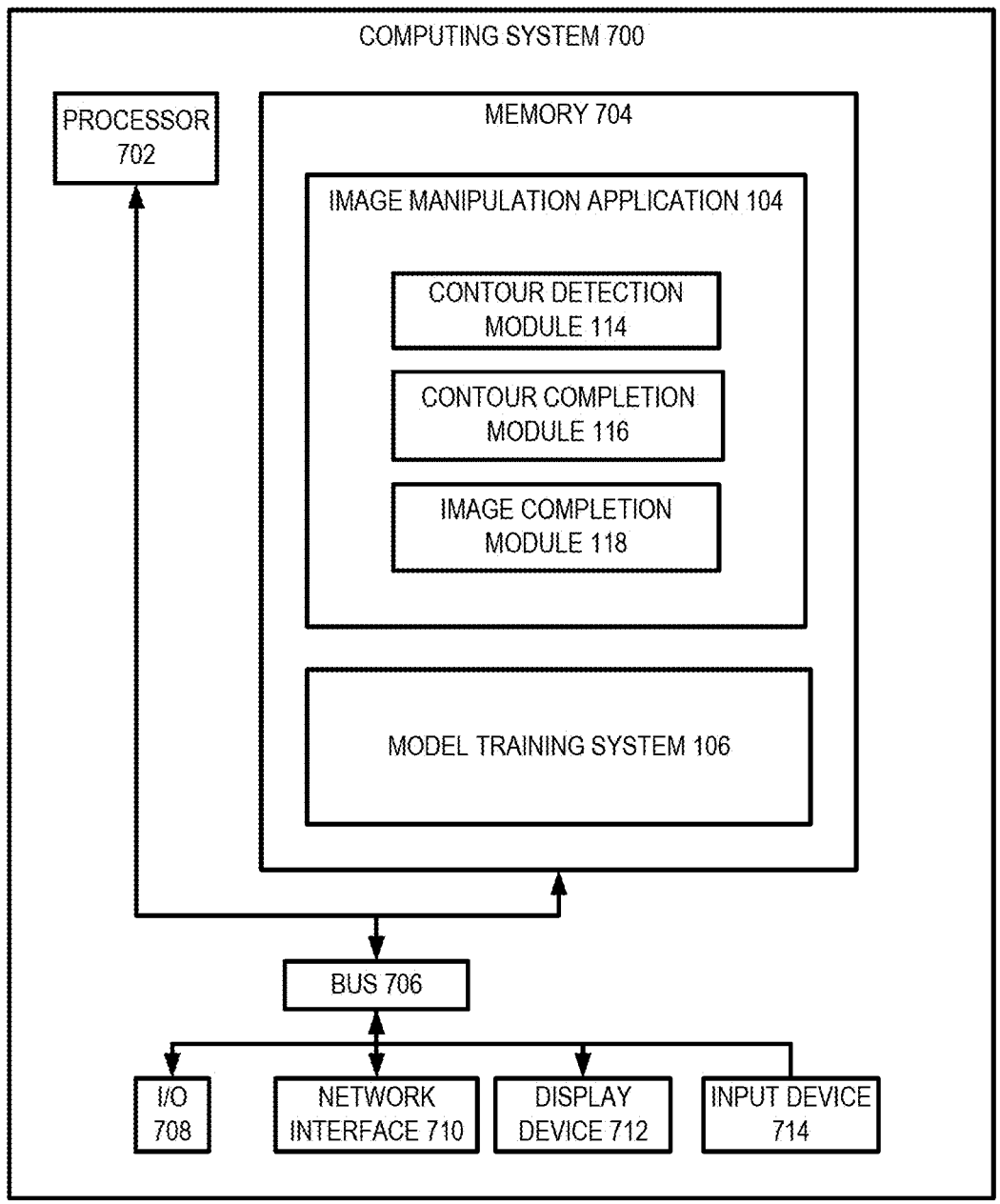
FIG. 7 depicts an example of a computing system that executes an image manipulation application for performing certain embodiments of the present disclosure.

Any suitable computing system or group of computing systems can be used for performing the operations described herein. For example, FIG. 7 depicts an example of a computing system 700 that can implement the computing environment of FIG. 1. In some embodiments, the computing system 700 includes a processing device 702 that executes the image manipulation application 104, a model training system 106, or a combination of both, a memory that stores various data computed or used by the image manipulation application 104 or the model training system 106, an input device 714 (e.g., a mouse, a stylus, a touchpad, a touchscreen, etc.), and a display device 712 that displays graphical content generated by the image manipulation application 104. For illustrative purposes, FIG. 7 depicts a single computing system on which the image manipulation application 104 or the model training system 106 is executed, and the input device 714 and display device 712 are present. But these applications, datasets, and devices can be stored or included across different computing systems having devices similar to the devices depicted in FIG. 7.

The depicted example of a computing system 700 includes a processing device 702 communicatively coupled to one or more memory devices 704. The processing device 702 executes computer-executable program code stored in a memory device 704, accesses information stored in the memory device 704, or both. Examples of the processing device 702 include a microprocessor, an application-specific integrated circuit ("ASIC"), a field-programmable gate array ("FPGA"), or any other suitable processing device. The processing device 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 700 may also include a number of external or internal devices, such as an input device 714, a display device 712, or other input or output devices. For example, the computing system 700 is shown with one or more input/output ("I/O") interfaces 708. An I/O interface 708 can receive input from input devices or provide output to output devices. One or more buses 706 are also included in the computing system 700. The buses 706 communicatively couples one or more components of a respective one of the computing system 700.

The computing system 700 executes program code that configures the processing device 702 to perform one or more of the operations described herein. The program code includes, for example, the image manipulation application 104, the model training system 106 or other suitable applications that perform one or more operations described herein. The program code may be resident in the memory device 704 or any suitable computer-readable medium and may be executed by the processing device 702 or any other suitable processor. In some embodiments, all modules in the image manipulation application 104 (e.g., the contour detection module 114, the contour completion module 116, the image completion module 118, etc.) are stored in the memory device 704, as depicted in FIG. 7. In additional or alternative embodiments, one or more of these modules from the image manipulation application 104 are stored in different memory devices of different computing systems.

In some embodiments, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices (e.g., a computing device that receives inputs for image manipulation application 104 or displays outputs of the image manipulation application 104) via a data network using the network interface device 810.

An input device 714 can include any device or group of devices suitable for receiving visual, auditory, or other suitable input that controls or affects the operations of the processing device 702. Non-limiting examples of the input device 714 include a touchscreen, stylus, a mouse, a keyboard, a microphone, a separate mobile computing device, etc. A display device 712 can include any device or group of devices suitable for providing visual, auditory, or other suitable sensory output. Non-limiting examples of the display device 712 include a touchscreen, a monitor, a separate mobile computing device, etc.

Although FIG. 7 depicts the input device 714 and the display device 712 as being local to the computing device that executes the image manipulation application 104, other implementations are possible. For instance, in some embodiments, one or more of the input device 714 and the display device 712 can include a remote client-computing device that communicates with the computing system 700 via the network interface device 710 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A non-transitory computer-readable medium having program code that is stored thereon, the program code executable by one or more processing devices for performing operations comprising:
    applying, to an incomplete image comprising a hole area lacking image content, a contour detection operation that detects an incomplete contour of a foreground object in the incomplete image, wherein a placement of the hole area prevents the contour detection operation from detecting a completed contour of the foreground object;
    applying, to the incomplete contour and the incomplete image, a contour completion model that is trained to generate the completed contour for the foreground object; and
    generating image content for the hole area based on the completed contour and the incomplete image to generate a completed image, generating the image content for the hole area comprising applying an image completion model to the incomplete image and the completed contour, the image completion model comprising a generative adversarial network that comprises a generative model and a discriminative model.

2. The non-transitory computer-readable medium of claim 1, wherein the contour completion model comprises a generative adversarial network (GAN) that comprises a coarse contour generative model, a refined contour generative model and a discriminative model.

3. The non-transitory computer-readable medium of claim 2, the operations further comprising training the contour completion model that comprises applying a loss function that comprises a first loss term associated with content loss of the coarse contour generative model and the refined contour generative model and a second loss term associated with adversarial loss of the discriminative model, wherein one or more weights applied to the first loss term and the second loss term change over time.

4. The non-transitory computer-readable medium of claim 3, wherein the weights comprise a first weight applied to the first loss term of the loss function and a second weight applied to the second loss term of the loss function, and wherein a first ratio between the first weight and the second weight at a first stage of the training is higher than a second ratio between the first weight and the second weight at a second stage of the training.

5. The non-transitory computer-readable medium of claim 1, the operations further comprising training the image completion model that comprises applying a loss function that comprises a first loss term associated with content loss of the generative model and a second loss term associated with adversarial loss of the discriminative model, wherein a first ratio between a first weight applied to the first loss term and a second weight applied to the second loss term at a first stage of the training is higher than a second ratio between the first weight and the second weight at a second stage of the training.

6. The non-transitory computer-readable medium of claim 5, wherein the generative model comprises a coarse image generative model and a refined image generative model, and wherein the first loss term defines content loss of the coarse image generative model and content loss of the refined image generative model.

7. The non-transitory computer-readable medium of claim 1, wherein the contour detection operation comprises:
    detecting the foreground object to generate a foreground map, wherein detecting the foreground object comprises applying a contour model to the incomplete image; and generating the incomplete contour of the foreground object, wherein generating the incomplete contour comprises applying an edge detector to the foreground map.

8. A computer-implemented method in which one or more processing devices perform operations comprising:
    training an image completion model that comprises a generative model and a discriminative model;

a step for generating image content for a hole area contained in an incomplete image based on a contour of a foreground object in the incomplete image to generate a completed image, the step for generating the image content comprising applying the trained image completion model to the incomplete image to generate the completed image; and providing the completed image for display.

9. The computer-implemented method of claim 8, the operations further comprising training a contour completion model that comprises a generative adversarial network (GAN), the GAN comprising a coarse contour generative model, a refined contour generative model and a discriminative model, wherein the step for generating image content for the hole area comprises generating the contour of the foreground object based on the trained contour completion model.

10. The computer-implemented method of claim 9, wherein training the GAN comprises applying a loss function that comprises a first loss term associated with content loss of the coarse contour generative model and the refined contour generative model and a second loss term associated with adversarial loss of the discriminative model, wherein one or more weights applied to the first loss term and the second loss term change over time.

11. The computer-implemented method of claim 10, wherein the weights comprise a first weight applied to the first loss term of the loss function and a second weight applied to the second loss term of the loss function, and wherein a first ratio between the first weight and the second weight at a first stage of the training is higher than a second ratio between the first weight and the second weight at a second stage of the training.

12. The computer-implemented method of claim 8, wherein the training comprises applying a loss function that comprises a first loss term associated with content loss of the generative model and a second loss term associated with adversarial loss of the discriminative model, wherein a first ratio between a first weight applied to the first loss term and a second weight applied to the second loss term at a first stage of the training is higher than a second ratio between the first weight and the second weight at a second stage of the training.

13. The computer-implemented method of claim 12, wherein the generative model comprises a coarse image generative model and a refined image generative model, and wherein the first loss term defines content loss of the coarse image generative model and content loss of the refined image generative model.

14. A system comprising:
a processing device; and
a non-transitory computer-readable medium communicatively coupled to the processing device, wherein the processing device is configured to execute program code stored in the non-transitory computer-readable medium and thereby perform operations comprising:
detecting a foreground object in an incomplete image that comprises a hole area lacking image content;
detecting an incomplete segmentation map of the foreground object based on a location of the hole area, wherein the location of the hole area prevents a completed segmentation map of the foreground object from being detected;
generating a completed segmentation map for the foreground object based on the incomplete segmentation map and the incomplete image; and
generating a completed image comprising generating image content for the hole area based on the completed segmentation map and the incomplete image, generating image content for the hole area comprising applying an image completion model to the incomplete image and the completed segmentation map, the image completion model comprising a generative adversarial network that comprises a generative model and a discriminative model.

15. The system of claim 14, wherein generating the completed segmentation map comprises applying a segmentation map completion model to the incomplete segmentation map and the incomplete image, the segmentation map completion model comprising a generative adversarial network (GAN) that comprises a coarse segmentation map generative model, a refined segmentation map generative model and a discriminative model.

16. The system of claim 15, wherein the image completion model and the segmentation map completion model are jointly training to minimize a joint loss function defined based on a first loss function for the image completion model and a second loss function for the segmentation map completion model.

17. The system of claim 15, wherein the operations further comprise training the image completion model that comprises applying a loss function that comprises a first loss term associated with content loss of the generative model and a second loss term associated with adversarial loss of the discriminative model, wherein a first ratio between a first weight applied to the first loss term and a second weight applied to the second loss term at a first stage of the training is higher than a second ratio between the first weight and the second weight at a second stage of the training.

* * * * *